(12) United States Patent
Hueber

(10) Patent No.: US 6,345,675 B1
(45) Date of Patent: Feb. 12, 2002

(54) MOBILE APPARATUS

(76) Inventor: Franz Hueber, Pillenreuther Strasse 68, DE-90459 (DE)

(*) Notice: Subject to any disclaimer, the term of this patent is extended or adjusted under 35 U.S.C. 154(b) by 0 days.

(21) Appl. No.: 09/555,622

(22) PCT Filed: Dec. 14, 1998

(86) PCT No.: PCT/EP98/08196

§ 371 Date: Jun. 1, 2000

§ 102(e) Date: Jun. 1, 2000

(87) PCT Pub. No.: WO99/38756

PCT Pub. Date: Aug. 5, 1999

(30) Foreign Application Priority Data

Jan. 28, 1998 (EP) .............................. 98101455

(51) Int. Cl.$^7$ .............................................. B62D 61/00
(52) U.S. Cl. .................. 180/21; 180/218; 180/209; 180/375; 700/71; 701/124
(58) Field of Search .................. 180/218, 209, 180/21, 348, 349, 353, 354, 356, 371, 375; 74/5.4, 5.47; 700/71; 701/124

(56) References Cited

U.S. PATENT DOCUMENTS

| | | | | |
|---|---|---|---|---|
| 1,348,464 A | * | 8/1920 | Wheatley | 180/218 |
| 1,497,529 A | * | 6/1924 | Moog | 180/218 |
| 2,454,070 A | * | 11/1948 | Tourneau | 180/218 |
| 3,145,797 A | * | 8/1964 | Taylor | 180/21 |
| 3,313,365 A | * | 4/1967 | Jackson | 180/218 |
| 3,403,746 A | * | 10/1968 | Fox et al. | 180/218 |

FOREIGN PATENT DOCUMENTS

| | | |
|---|---|---|
| DE | 31 03 961 C2 | 9/1982 |
| DE | 36 26 322 A1 | 2/1988 |
| WO | WO 89/06117 | 7/1989 |

OTHER PUBLICATIONS

Patent Abstracts of Japan, vol. 10, No. 249, pub. No. 610 77 576, Apr. 21, 1984.

* cited by examiner

Primary Examiner—J. J. Swann
Assistant Examiner—F. Zeender
(74) Attorney, Agent, or Firm—Hoffman & Baron, LLP

(57) ABSTRACT

Described is a mobile apparatus (10) having at least one wheel (14) which is rotatable about a wheel axle (12). A main body (16) of the apparatus is mounted swingingly on the wheel axle (12). Oscillating movements of the main body (16) about the wheel axle (12) are compensated by means of a compensating weight (68) which is definedly movable out of the normal rest position by means of a regulator (56). A drive device (18) is provided on the main body (16) for driving the at least one wheel (14) of the mobile apparatus (10). The wheel axle (12) has at least one differential (20) which is operatively connected to the drive device (18) and which is arranged between the at least one wheel (14) and an associated pinion (36) which is operatively connected to the associated regulator (56) and to the corresponding compensating weight (68) or to the compensating weight (68) formed by the respective regulator (56).

9 Claims, 4 Drawing Sheets

MOBILE APPARATUS

BACKGROUND OF THE INVENTION

1. Field of the Invention

The invention concerns a mobile apparatus having at least one wheel which is rotatable about a wheel axle, a main body which is mounted swingingly on the wheel axle and the centre of gravity of which is beneath the wheel axle, a compensating weight which compensates for oscillating movements of the main body about the wheel axle and which is movable in a defined manner by means of a regulator from the normal rest position in which the overall centre of gravity of the main body and the compensating weight is disposed perpendicularly with respect to the wheel axle, and a drive device provided on the main body for driving the at least one wheel of the mobile apparatus.

2. Description of the Prior Art

Such a mobile apparatus is known from DE 31 03 961 C2. In that known mobile apparatus, the compensating weight for compensating for oscillating movements of the main body about the wheel axle is formed for example by a battery pack. Defined displacement of the battery pack is effected by means of a simple pendulum mechanism as the regulator, which is mounted on the center line of the mobile apparatus and which regulates an electric motor and a screwthreaded rod in such a way that the battery pack—like the slide or tool carriage of a turning lathe—moves to and fro, as is described in column 3, lines 20ff. This publication does not set forth more detailed information as to how that pendulum mechanism operates.

OBJECTS AND SUMMARY OF THE INVENTION

The object of the invention is to provide a mobile apparatus of the kind set forth in the opening part of this specification, in which regulation of the compensating weight which compensates for oscillating movements of the main body of the apparatus about the wheel axle is automatically and independently effected simultaneously with the drive of the at least one wheel of the mobile apparatus, while rotational moments resulting in tilting or rocking of the main body are immediately compensated.

In accordance with the invention, in a mobile apparatus of the kind set forth in the opening part of this specification, that object is attained in that the wheel axle of the at least one wheel has a differential which is operatively connected to the drive device and which is arranged between the at least one wheel and an associated pinion which is operatively connected to the associated regulator and to the associated compensating weight or to the compensating weight formed by the respective regulator.

In a mobile apparatus in accordance with the invention of such a configuration therefore there is advantageously no need for electronic or other additional devices in order to promptly compensate for an undesired rotational moment which would result in tipping or rocking of the main body about the wheel axle of the mobile apparatus. In the case of the apparatus according to the invention the regulator acts against such an undesired rotational moment or an undesired rotational pulse just as long as is required to maintain the dynamic equilibrium.

The at least one compensating weight of the mobile apparatus according to the invention can be provided in per se known manner with a servo hydraulic or a servo pneumatic system which, during the duration of the corresponding rotational pulse, ensures exact displacement of the corresponding compensating weight into the required direction. The construction with said servo hydraulic system or servo pneumatic system affords the further advantage that frictional resistances in the corresponding regulating section can be eliminated.

In the mobile apparatus according to the invention, the respective differential can be operatively connected to the drive device by means of a drive shaft, a drive wheel fixed on the drive shaft, and an output wheel which is fixed to the differential housing and which meshes with the drive wheel. Said drive wheel can be for example a bevel drive wheel and the output wheel can be a ring gear, as are known from conventional differentials. The output wheel is connected to a brake disk.

It is desirable in the mobile apparatus according to the invention if the regulator has a main portion fixed to the main body and a displacement portion which is disposed linearly movably on the main portion and which has a toothed rack meshing with the pinion, wherein a spring device is provided between the main portion and the displacement portion. The spring device preferably has two identical spring elements of which the one spring element, upon displacement of the displacement portion, is loaded in tension and the other spring element is loaded in compression, and vice-versa. The two spring elements do not have to be fixedly stressed between the displacement portion and the main portion. In that case, only one spring element is correspondingly loaded upon each displacement of the displacement portion.

The arrangement affords a rotational pulse-controlled regulating system with pulse take-off by way of the at least one differential which outputs the respective rotational pulse by way of the wheel axle and the associated pinion and by way of the two spring elements between the main body which is fixed with respect to the vehicle and the displacement portion provided thereon, and converts it directly into a corresponding displacement of the associated compensating weight. In that way the mobile apparatus or its main body which is mounted swingingly on the wheel axle is prevented from performing an oscillating movement about the wheel axle.

The above-mentioned spring elements of the spring device can be formed for example by coil springs or by other correspondingly acting elements such as gas springs or the like.

A compact configuration for the mobile apparatus according to the invention is afforded if the displacement portion of the regulator is provided with the compensating weight and thus directly forms the compensating weight. In this case, the direction of movement of the regulator for the equilibrium condition is to be produced by a suitable transmission effect.

The mobile apparatus according to the invention may be a single-wheel single-axle vehicle, a two-wheel single-axle vehicle or a multi-axle vehicle. In the case of a multi-axle vehicle the wheels of one side of the vehicle can be viewed as an ideal wheel. That ideal wheel is determined by the circle which touches the end wheels of the respective side of the wheel, that is to say embraces same in contacting relationship. The axis of that ideal wheel, in such a vehicle, is the above-mentioned wheel axle, in regard to the overall center of gravity.

In the case of the single-axle two-wheel vehicle, a respective wheel can be provided at each of the two mutually remote end portions of the wheel axle, in which case associated with each of the two wheels is a differential and a regulator as well as a common compensating weight, while it is possible to provide on the wheel axle a central differential which is operatively connected to the compensating weight. When the mobile apparatus is of such a design configuration, a central drive wheel can be fixed on the differential housing of the central differential and meshes with a central output wheel, and the compensating weight which is movable along a linear guide device can have a toothed rack which meshes with the central output wheel.

In the above-described design configuration of the mobile apparatus therefore the compensating weight is displaced with a regulated linear movement in order to definedly avoid, that is to say compensate for, oscillating movements of the main body of the mobile apparatus about the wheel axle. It is however also possible for the pinion which is fixed to the wheel axle to be connected to a pendulum weight which forms the compensating weight. That pendulum weight can be for example a body which is in the shape of a segment of a disk.

The invention affords a rotational pulse-controlled regulation effect with pulse take-off by way of a differential, wherein the pendulum weight converts the respective rotational pulse into a rotational or pivotal movement which pivots and correspondingly raises the pendulum weight, whereby the main body of the apparatus is relieved of load in the reaction to the corresponding rotational pulse, this signifying compensation for the oscillating movement of the main body about the wheel axle.

The mobile apparatus according to the invention affords the advantage that the vehicle, that is to say its main body which is mounted swingingly on the wheel axle, is prevented from performing a rocking or seesaw movement. That applies both in regard to mobile apparatuses which roll on a base or those which are suspended on a rail or on a cable. A further advantage is that the mobile apparatus according to the invention does not require starting regulators or electric motors as a drive device. That gives rise to the further advantage that the risk of non-functioning as a result of failure of electrical or electronic parts of the mobile apparatus is eliminated as an equilibrium is maintained between the rotational moment generated by the drive device and the compensating rotational moment produced by the compensating weight, by motor power. In a similar manner, mass inertia upon braking maintains the condition of equilibrium to the required extent.

As the regulating mechanism converts the rotational moment triggered by acceleration (or braking)—insofar as it is not absorbed by the at least one wheel of the mobile apparatus—into a regulated displacement of the compensating weight—and more specifically just as much as the at least one wheel does not absorb rotational moment force—there is the further advantage that the mobile apparatus according to the invention is suitable for normal on-road traffic. In that respect even insensitive control of the respective vehicle does not give rise to any difficulties. The principle in accordance with the invention represents an advantageous development even in the case of per se known multi-axle vehicles, from safety aspects.

In the case of vehicles according to the invention which are suspended on cables or rails, use of the principle according to the invention affords the advantage that it is possible to start and decelerate more rapidly and briskly than hitherto, because at any time corresponding oscillating movements of the main body of the apparatus about the wheel axle are reliably compensated in a simple manner. For such vehicles which are suspended from cables or rails, that results in a greater maximum speed which is reasonable in regard to the safety demands of the passengers of such a vehicle.

Further details, features and advantages will be apparent from the following description of an embodiment of the mobile apparatus according to the invention, as is diagrammatically shown in the drawing:

DETAILED DESCRIPTION OF THE INVENTION

Figure 1:
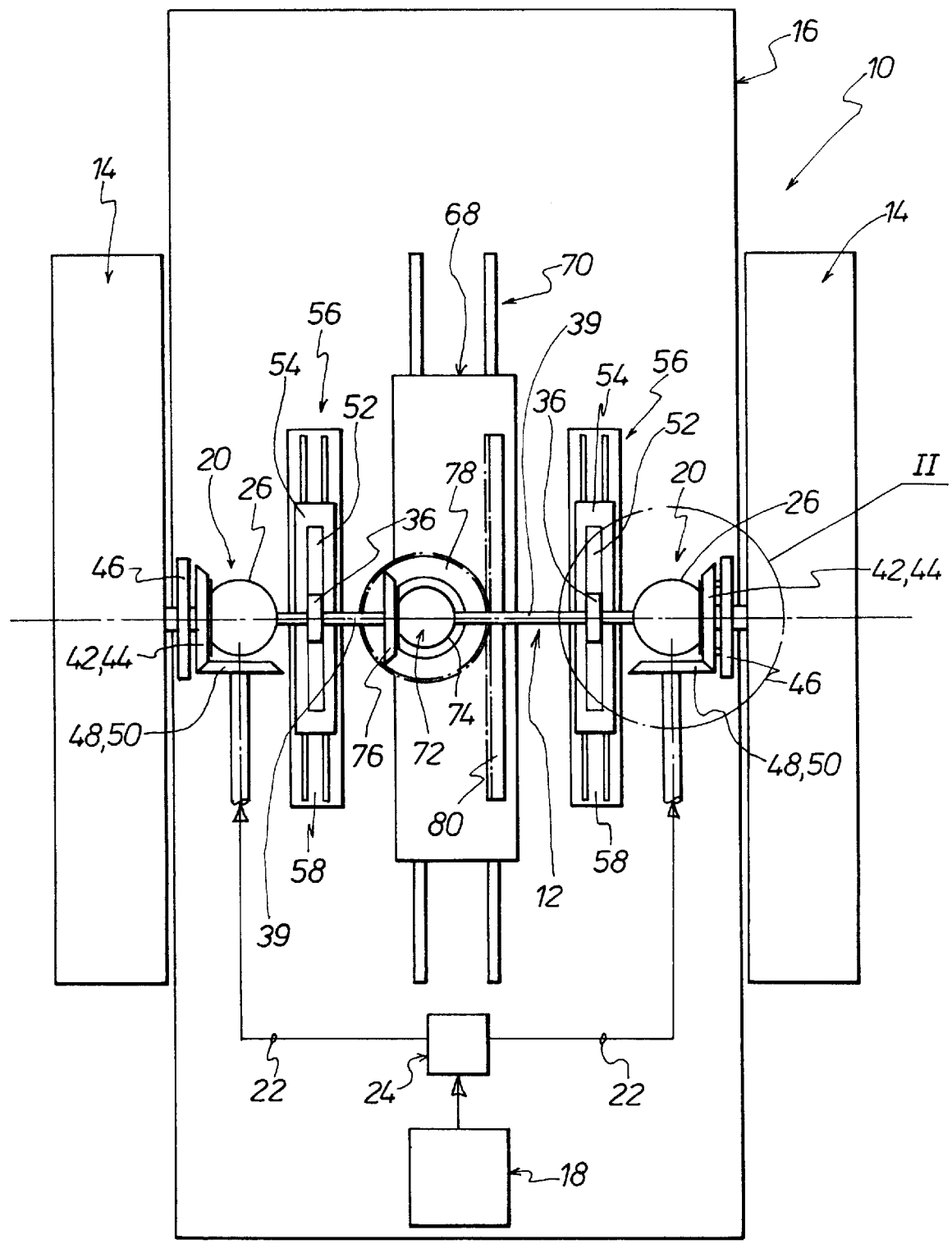
FIG. 1 is a diagrammatic plan view of an embodiment of the mobile apparatus with a wheel axle having two wheels.

FIG. 1 is a diagrammatic plan view of an embodiment of the mobile apparatus 10 which has a wheel axle 12, on each of the mutually remote end portions of which is provided a respective wheel 14. A main body 16 of the apparatus is swingingly mounted on the wheel axle 12. The main body 16 is for example a vehicle cabin. In the normal rest position, the overall center of gravity of the main body 16 is disposed perpendicularly under the wheel axle 12.

Figure 2:
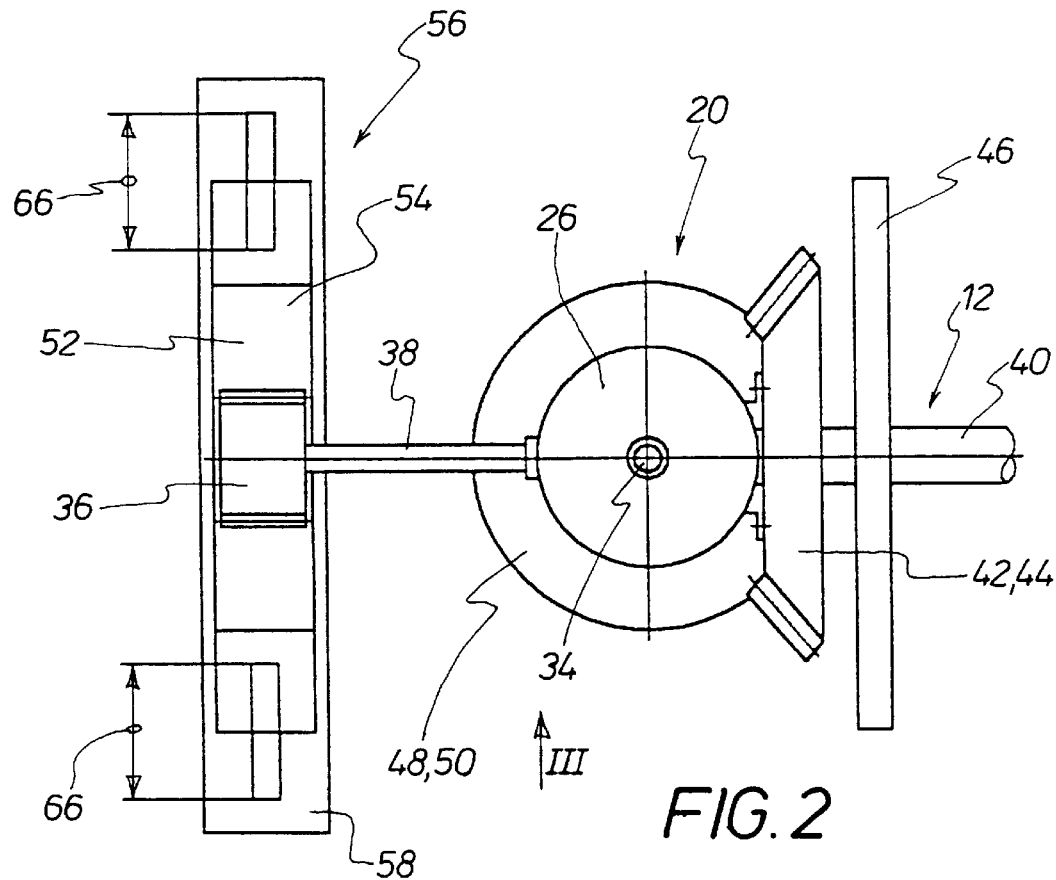
FIG. 2 is a view of the detail indicated at II in FIG. 1.

Provided on the main body 16 is a drive device 18 which for example is an electric motor or an internal combustion engine. Associated with each of the two wheels 14 is a differential 20 which is described hereinafter with reference to FIGS. 2 and 3. The two differentials 20 are operatively connected to the drive device 18, as is indicated by the angled arrows 22. That operative connection is provided with a central differential gear 24 which, like the drive device 18, is only diagrammatically indicated by a block.

Figure 3:
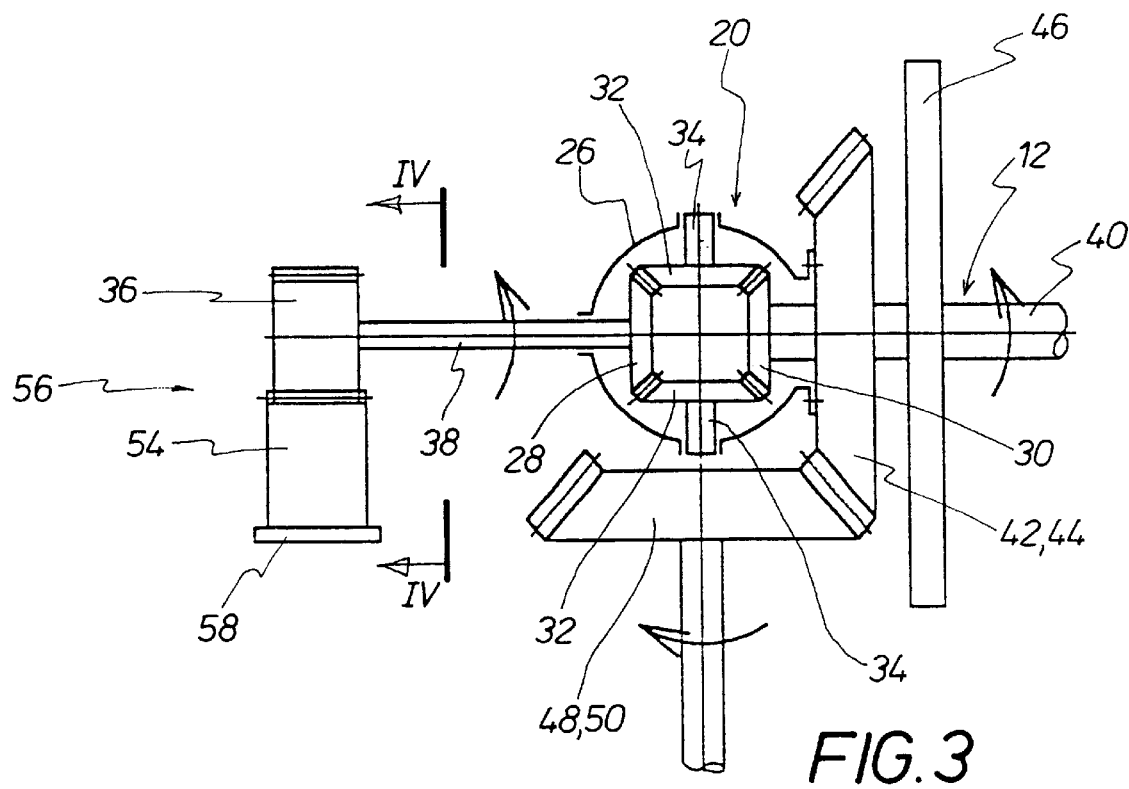
FIG. 3 shows the detail II indicated in FIG. 1 viewing in the direction of the arrow III in FIG. 2.

As can be seen in particular from FIG. 3, the respective differential 20 has a differential housing 26 in which are mounted ring gears 28 and 30 and differential gears 32 meshing with the ring gears 28 and 30. The differential gears 32 are rotatably supported in the differential housing 26 by means of trunnions 34.

The ring gear 28 is connected to a pinion 36 by means of a portion 38 of the wheel axle 12. The ring gear 30 is connected to a portion 40 of the wheel axle 12, on which the associated wheel 14 is mounted.

An output wheel 44 formed by a ring gear 42 is fixedly connected to the differential housing 26. A brake disk 46 is fixedly connected to the ring gear 42 forming the output wheel 44.

The portion 40 of the wheel axle 12 extends through the ring gear 42 and through the brake disk 46. Meshing with the ring gear 42 is a drive wheel 48 which as is known can be formed by a bevel drive wheel 50.

Figure 4:
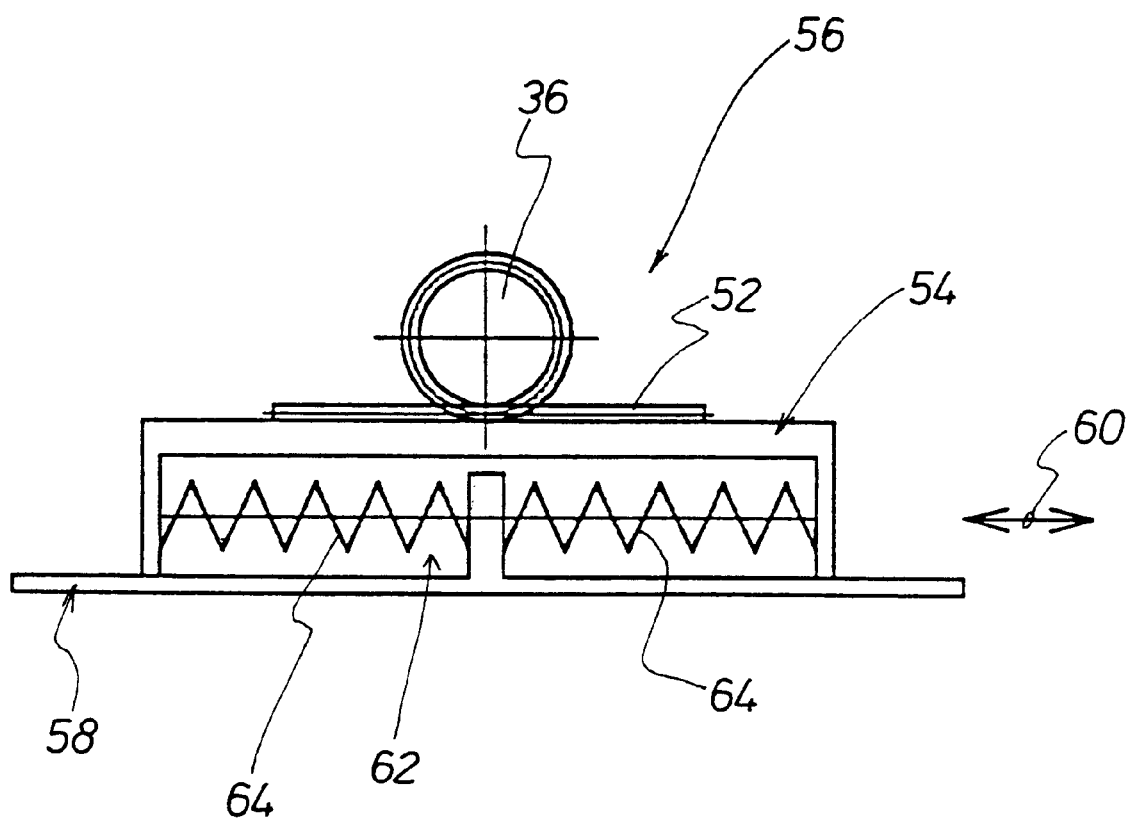
FIG. 4 is a view in the direction of the arrows IV—IV in FIG. 3 to show an embodiment of the regulator of the mobile apparatus as shown in FIG. 1.

The pinion 36 is in meshing engagement with a toothed rack 52 (see in particular FIG. 4) provided on a displacement portion 54 of a regulator 56. The displacement portion 54 is arranged linearly movably on a main portion 58 of the regulator 56, as is indicated in FIG. 4 by the double-headed arrow 60. Provided between the main portion 58 which is fixed with respect to the apparatus and the displacement portion 54 is a spring device 62 formed by two spring elements 64. Rotation of the pinion 36 in one direction or the other results in a corresponding displacement of the displacement portion 54 and thus causes the one spring element 64 to be loaded in tension and the other spring element 64 of the spring device 62 to be loaded in compression, and vice-versa. The corresponding regulating distance of the regulator 56 is indicated by the arrows 66 in FIG. 2.

FIG. 1 shows two such regulators 56 with their respective main portion 58, their associated displacement portion 54 with toothed rack 52 and the pinion 36 which meshes with the respective toothed rack 52. Provided between the two regulators 56 associated with the wheels 14 is a common compensating weight 68 which is controlledly linearly movable along a linear guide device 70. Provided on the wheel axle 12 which extends between the two wheels is a central differential 72 having a housing 74 and a large ring gear 76 which is fixedly connected to the housing 74. The large ring gear 76 meshes with a bevel wheel 78 meshing with a toothed rack 80 of the compensating weight 68.

In place of the central compensating weight 68, it is also possible for the respective displacement portions 54 of the regulators 56 to be provided with a compensating weight. Attention is to be paid to providing for a suitable direction of movement of the regulators 56, by a suitable transmission effect.

Figure 5:
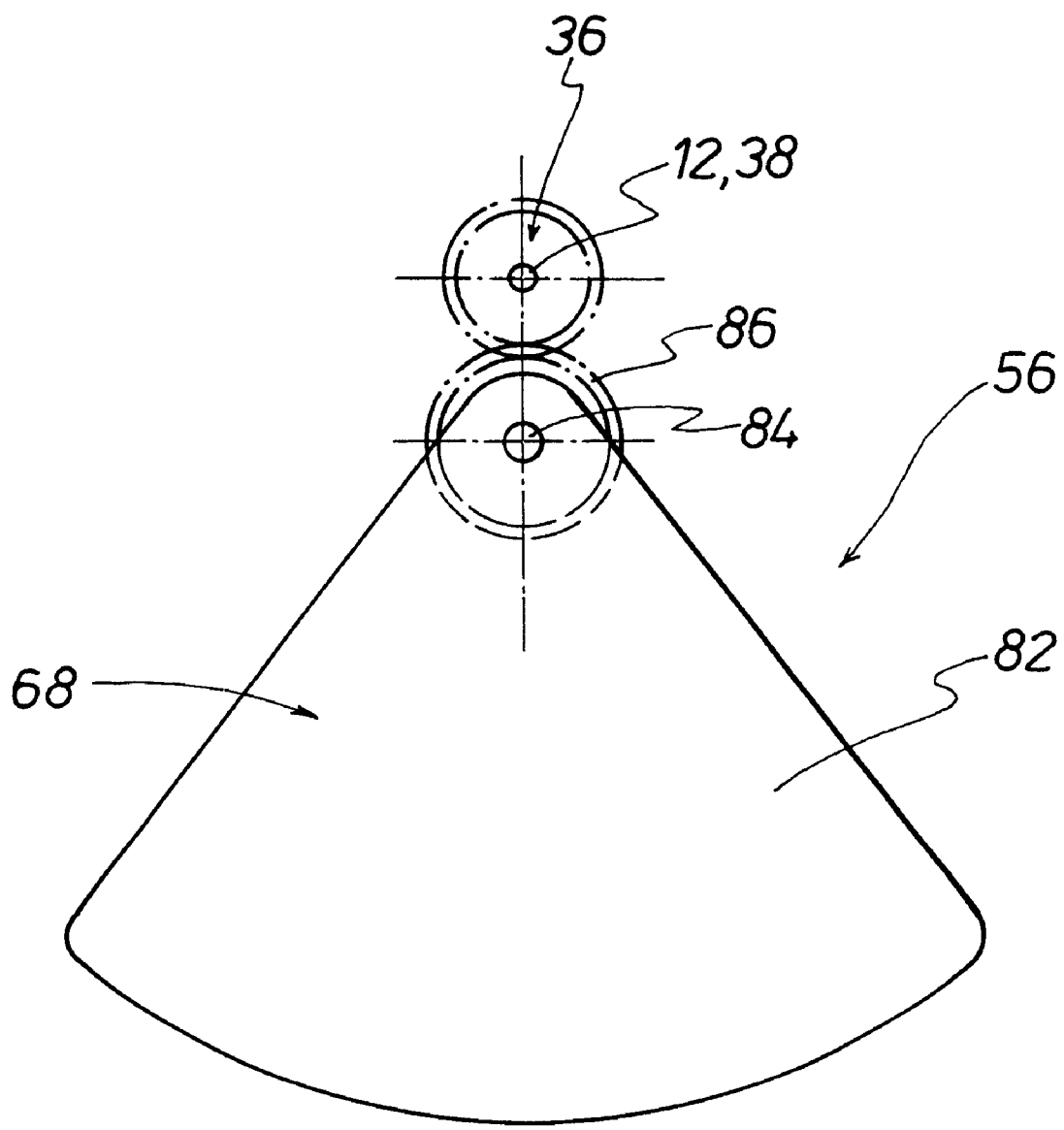
FIG. 5 is a view similar to FIG. 4 showing another embodiment of the regulator.

While FIGS. 1 through 4 show a linear regulator 56, FIG. 5 shows a regulator 56 with a pendulum weight 82 which forms the compensating weight 68 and from which there projects an axis 84 on which an output pinion 86 is fixed. The output pinion 86 meshes with the pinion 36 which has been described hereinbefore with reference to FIGS. 1 through 4.

The mode of operation involved for a single-axle two-wheel vehicle will now be described. The mode of operation described applies in corresponding fashion in relation to a single-axle single-wheel vehicle or a multi-axle vehicle with a drive axle designed in accordance with the invention.

Operation of the vehicle is implemented basically in the same manner as is usual in relation to suspended cars or track-laying vehicles. The same applies in regard to braking and steering the vehicle, in which respect steering in the case of a road vehicle is effected for example by braking at one side. In that respect the central differential gear 24 (see FIG. 1) provides for suitable application of power to the wheels 14. Braking and steering are therefore effected by way of the brake disks 46. As already mentioned above, the brake disks 46 are not connected to the wheels 14 but to the ring gears 42 of the differentials 20 associated with the wheels 14.

When starting in the direction of forward travel, the main body 16 of the mobile apparatus 10, without the above-mentioned differentials 20 would receive a rotational pulse which would urge upwardly the front part of the main body, as the corresponding wheel 14, as a consequence of mass inertia, only gradually converts the applied rotational pulse into a rotational movement and thus into forward motion of the mobile apparatus 10. The differential 20 associated with the respective wheel 14 however absorbs the rotational pulse coming from the corresponding drive wheel 48, by way of the ring gear 42 meshing with same, so that said rotational pulse—so long as and insofar as it is not absorbed by the ring gear 30 connected to the corresponding wheel 14—is outputted to the other ring gear 28 by means of the differential gears 32. The last-mentioned ring gear 28, by means of the portion 38 of the wheel axle 12, moves the associated pinion 36 and therewith, by way of the rack 52 meshing with the pinion 36, the displacement portion 54 of the regulator 56. That movement of the displacement portion 54 takes place against the spring force of the spring device 62. In this situation, the spring elements 64 of the spring device 62 yield in dependence on the rotational pulse applied. Their elongation or compression distance respectively increases linearly with the above-mentioned rotational pulse applied. The displacement portion 54 of the regulator 56 is correspondingly displaced. At the same time the portion 39 of the wheel axle 12 is prevented from a rotational movement beyond the required extent which is necessary for displacement of the compensating weight 68 (see FIG. 1). Jointly with the portion 39 of the wheel axle 12 which is associated with the other wheel 14, the compensating weight 68 is displaced in a defined manner, by way of the central differential 72. That displacement can be assisted by servo hydraulic means or servo pneumatic means. It can also be effected for example by way of a screwthreaded spindle or the like. Displacement of the compensating weight 68 is effected proportionally to the mean value of the loading of the two spring elements 64 of the two regulators 56 associated with the wheels 14.

The single central compensating weight 68 can also be replaced by two compensating weights. In that case the central differential 72 is also redundant. The said compensating weights 68 can be provided on the displacement portion 54 of the respective regulator 56, with a transmission wheel or the like which is installed according to the necessary direction. That is possible in particular if the frictional resistance of the respective regulator 56, due to a suitable mounting arrangement, is negligibly small, the spring elements 64 between the main portion 58 and the displacement portion 54 of the respective regulator 56 and thus the respective regulating distance 66 (see FIG. 2) are correspondingly optimally proportioned and the compensating weight 68 of the respective regulator 56 is of a suitable size. With such a design configuration therefore the regulators 56 or their displacement portions 54 themselves can form the respective compensating weight 68.

The compensating weight 68 which is displaced forwardly when the mobile apparatus 10 starts thus prevents unwanted lifting movement of the front part of the apparatus 10. The compensating weight 68 therefore affords precisely as much resistance to unwanted lifting movement of the front part of the apparatus 10, due to the corresponding mass inertia rotational pulse, as the spring elements 64 afford resistance to the pulse triggering displacement.

The crucial consideration in regard to the above-mentioned resistance to the rotational pulse is not the displacement of the compensating weight 68 but the movement of the center of gravity of the whole of the mobile apparatus 10. That movement of the center of gravity occurs proportionally to the displacement of the compensating weight 68. If therefore the rotational pulse increases, the spring elements 64 correspondingly yield. In the same manner, the resistance to the rotational pulse increases—more specifically both at the ring gear 28 operatively connected to the respective regulator 56, and also at the drive wheel 48 of the respective differential 20. Therefore, with an increasing rotational pulse, a corresponding mechanical resistance is built up until the ring gear 30 connected to the corresponding wheel 14 and therewith the corresponding wheel 14 itself receive the rotational pulse and convert it into a movement of the mobile apparatus 10. As now the rotational moment acting at the other ring gear 28 decreases, the spring elements 64 of the spring device 62 of the respective regulator 56, by virtue of movement into the initial condition, urge the regulator 56 into the initial position. As a result the compensating weight 68 is correspondingly moved into the rest or basic position. That ensures that, with a decreasing residual rotational moment, the mobile apparatus 10 does not tilt downwardly with its front part, in an unwanted fashion.

Travelling up a gradient at a constant speed corresponds to starting or acceleration on the flat, with a corresponding amount of force. Travelling on the flat at a constant speed corresponds to moderate starting as the air resistance has the same effect as mass inertia on the system, that is to say the mode of operation of the at least one regulator 56 is always the same. Horizontal orientation of the main body 16 of the apparatus is always ensured in the same manner.

Travelling down a gradient with a braking action corresponds to the normal braking condition, like also parking on a slope. In that respect it is immaterial whether braking is implemented by using brake shoes or pads or by means of the drive device 18 as the brake disk 46 is fixedly connected to the associated ring gear 42. The essential difference in regard to starting on the flat or travelling up a gradient however is that the rotational pulse comes from the corresponding wheel 14 and the ring gear 30 which is fixedly connected thereto.

The procedure involved in braking the mobile apparatus 10 is as follows: as, upon actuation of the brakes shoes or pads (not shown) of the mobile apparatus 10, the ring gear 42 and the brake disk 46 are braked, as in the case of track-laying vehicles, the differential gears 32 of the respective differential 20 transmit the rotational pulse of the ring gear 30 to the other ring gear 28 which is connected to the regulator 56, as that ring gear provides the lowest degree of resistance, as a result of the spring elements 64 being in the initial or rest position. The torque also acts in accordance with the respective intensity of braking on the mobile apparatus 10 or the main body 16 of the apparatus. As however the rotational characteristics of the differential gears 32, with a relatively inert differential housing 26 and rotational pulse due to the ring gear 38, are now opposite to the rotational characteristics with an inert ring gear 30 and a rotational pulse produced by the housing 26, the compensating weight 68 is displaced in a defined controlled manner in the opposite direction, by the regulating system according to the invention. In that way, the inclination of the front part of the mobile apparatus 10, which otherwise usually occurs upon braking, is prevented by the rearwardly displaced center of gravity of the overall system.

Desirably, the braking operation can be repeatedly interrupted just before the mobile apparatus 10 comes to a halt so that the gripping action of the brakes shoes or jaws (not shown) does not result in a particularly severe displacement of the compensating weight 68. Because of that, the main body 16 of the apparatus can admittedly begin to swing slightly about the wheel axle 12, but the displacement of the compensating weight 68 when the apparatus 10 stops is sufficiently slight as a result so that a delay action in the regulating system does not result in the main body 16 of the apparatus assuming an undesired inclined position rearwardly about the wheel axle 12. Briefly releasing the braking arrangement after reaching the stopped condition improves the equilibrium position of the main body 16 of the apparatus. A per se known sensitive anti-lock system for example can be used for braking the mobile apparatus 10.

Travelling on a downward gradient in an idle condition corresponds to the situation of the apparatus 10 when standing on the flat. As the drive device 18 and the brake shoes or pads (not shown) of the brake disks 46 are not gripping, the rotational moment coming from the corresponding wheel 14 has no opportunity to exert a rotational pulse on the ring gear 28 of the corresponding differential 20. Therefore no rotational pulse is also transmitted to the corresponding regulator 56 as the differential housing 26 also correspondingly rotates with the wheel 14.

What is claimed is:

1. A mobile apparatus having a first wheel which is rotatable about a wheel axle, a main body which is mounted swingingly on the wheel axle and the centre of gravity of which is beneath the wheel axle, a compensating weight which compensates for oscillating movements of the main body about the wheel axle and which is movable in a defined manner by means of a first regulator from the normal rest position in which the overall centre of gravity of the apparatus is perpendicularly beneath the wheel axle, and a drive device provided on the main body for driving the first wheel of the mobile apparatus, wherein the wheel axle of the first wheel has a first differential which is operatively connected to the drive device and which is arranged between the first wheel and an associated pinion which is operatively connected to the associated first regulator and to the associated compensating weight.

2. A mobile apparatus as set forth in claim 1, wherein the first differential is operatively connected to the drive device by means of a drive shaft, a drive wheel fixed on the drive shaft and an output wheel which is fixed on a differential housing and which meshes with the drive wheel.

3. A mobile apparatus as set forth in claim 2, wherein a brake disk is connected to the output wheel.

4. A mobile apparatus as set forth in claim 1, wherein the first regulator has a main portion fixed to the main body and a displacement portion which is provided linearly movably on the main portion and which has a toothed rack meshing with the pinion, wherein a spring device is provided between the main portion and the displacement portion.

5. A mobile apparatus as set forth in claim 4, wherein the spring device has two identical spring elements, one spring element, upon displacement of the displacement portion, is loaded in tension and the other spring element is loaded in compression.

6. A mobile apparatus as set forth in claim 4, wherein the displacement portion is provided with the compensating weight.

7. A mobile apparatus as set forth in claim 1, further comprising a second wheel, the first and second wheel being provided at each of the two mutually remote end portions of the wheel axle, wherein a second differential and a second regulator are associated with the second wheel and provided on the wheel axle is a central differential which is operatively connected to the compensating weight.

8. A mobile apparatus as set forth in claim 7, wherein a central drive wheel is fixed on a differential housing of the central differential, the central drive wheel meshing with a central output wheel, and the compensating weight which is movable along a linear guide device has a toothed rack meshing with the central output wheel.

9. A mobile apparatus as set forth in claim 1, wherein the pinion fixed on the wheel axle is operatively connected to a pendulum weight forming the compensating weight.

* * * * *